United States Patent
Hoogland

(10) Patent No.: US 7,771,645 B2
(45) Date of Patent: Aug. 10, 2010

(54) MOLD AND METHOD FOR FORMING PRODUCTS

(75) Inventor: Hendricus Antonius Hoogland, Wormer (NL)

(73) Assignee: ECIM Technologies B.V., Ijssel (NL)

(*) Notice: Subject to any disclaimer, the term of this patent is extended or adjusted under 35 U.S.C. 154(b) by 168 days.

(21) Appl. No.: 11/794,463

(22) PCT Filed: Dec. 23, 2005

(86) PCT No.: PCT/NL2005/000888

§ 371 (c)(1),
(2), (4) Date: Nov. 16, 2007

(87) PCT Pub. No.: WO2006/071111

PCT Pub. Date: Jul. 6, 2006

(65) Prior Publication Data

US 2008/0116613 A1    May 22, 2008

(30) Foreign Application Priority Data

Dec. 28, 2004    (NL) ..................... 1027912

(51) Int. Cl.
B29C 45/56    (2006.01)

(52) U.S. Cl. .................... 264/328.7; 425/542

(58) Field of Classification Search .............. 264/328.7; 425/542
See application file for complete search history.

(56) References Cited

U.S. PATENT DOCUMENTS

| 4,025,022 | A | | 5/1977 | Theysohn et al. ............. 249/63 |
| 4,481,161 | A | * | 11/1984 | Grannen, III ............ 264/328.8 |
| 4,732,558 | A | * | 3/1988 | Grannen, III ............... 425/570 |
| 6,428,734 | B1 | * | 8/2002 | Vandevelde et al. ...... 264/328.8 |

FOREIGN PATENT DOCUMENTS

| DE | 42 17 343 A1 | 12/1993 |
| DE | 44 43 145 C1 | 3/1996 |
| EP | 0 061 072 A2 | 9/1982 |
| EP | 0 832 727 A1 | 4/1998 |
| EP | 0999 023 A1 | 5/2000 |
| JP | 60-83820 * | 5/1985 |
| WO | WO 03/039838 | 5/2003 |
| WO | WO 2004/039556 A1 | 5/2004 |

\* cited by examiner

*Primary Examiner*—Jill L Heitbrink
(74) *Attorney, Agent, or Firm*—Hoffmann & Baron, LLP

(57) ABSTRACT

Mold (20), provided with a mold cavity which is at least partly defined by a movable wall part (50), wherein injection means (34) are provided for introducing material into the mold cavity, which injection means comprise at least one injection opening (34A) which is provided in at least one stationary wall part (80) of the mold cavity, wherein said stationary wall part (80) is at least partly surrounded by said at least one movable wall part (50).

15 Claims, 7 Drawing Sheets

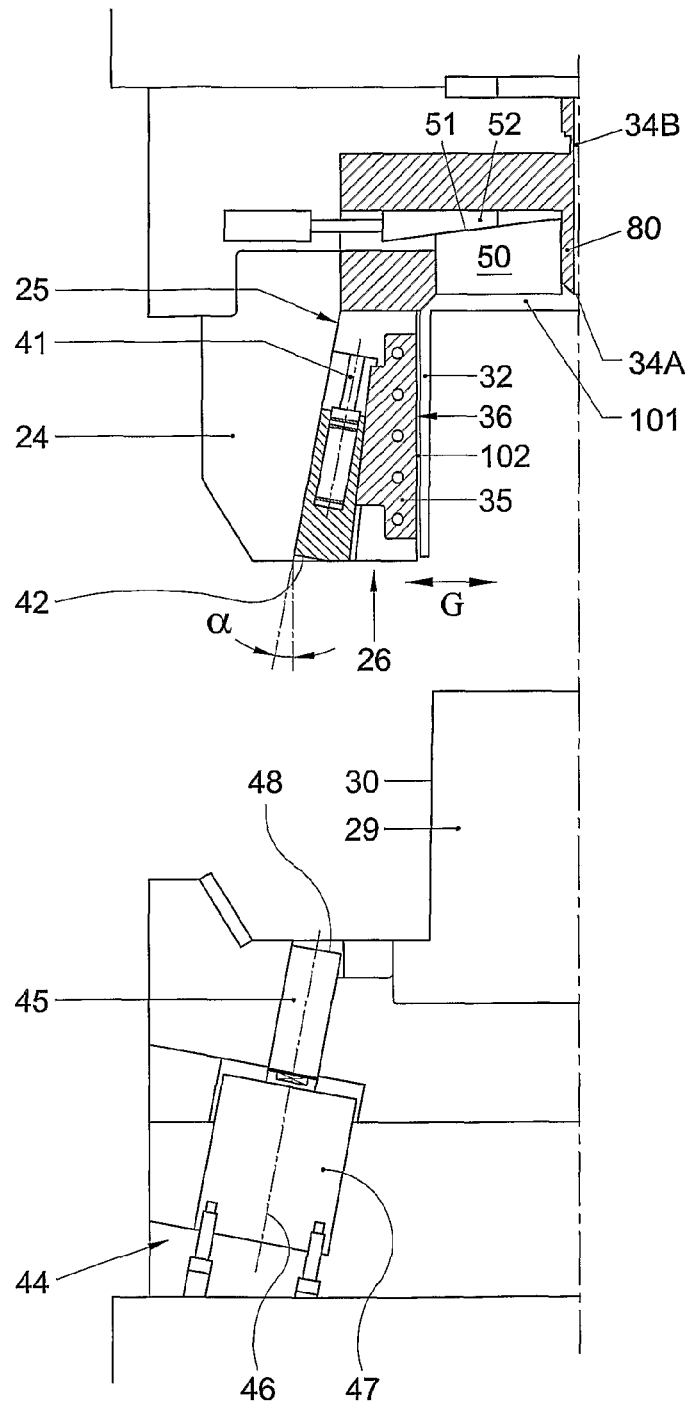
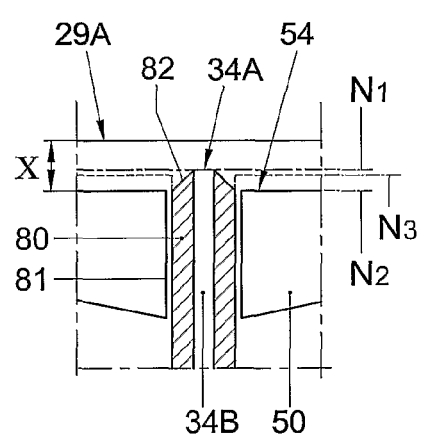
Fig. 4B
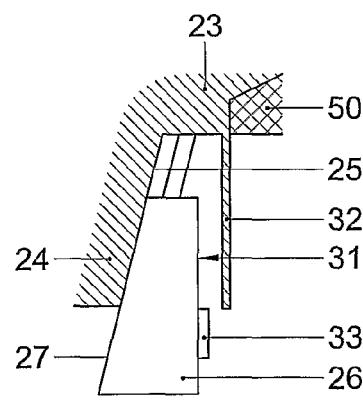
Fig. 4                    Fig. 4A

MOLD AND METHOD FOR FORMING PRODUCTS

This application is the U.S. National Phase of, and Applicant claims priority from, International Application Number PCT/NL2005/000888 filed 23 Dec. 2005 and Netherlands Patent Application bearing Serial No. 1027912 filed 28 Dec. 2004, which are incorporated herein by reference.

BACKGROUND OF THE INVENTION

The invention relates to a mold for forming products. The invention relates in particular to such a mold for forming plastic products.

Mold-forming products provides the advantage that products can be manufactured relatively simply and reproducibly. Use can then be made, for instance, of injection molding technique. A disadvantage of this is that relatively high injection pressures are necessary to make the material spread throughout the mold cavity. Moreover, the injection temperature should be relatively high in order to prevent the material solidifying before the whole mold cavity has been filled. As a consequence, particularly high closing forces need to be applied to the mold, and stresses develop in the material and the product to be molded, which lead to an undesirably high degree of inaccuracy.

In existing molds, plastic is conventionally introduced into a part of a mold cavity with fixedly arranged wall parts. Accordingly, no solution to the above-stated problems is offered.

In existing compression molding techniques, plastic is introduced into the mold cavity with the mold partly open. Thus, the space in which the plastic is to be introduced is temporarily enlarged, so that less backpressure and moreover initially shorter flow paths are obtained. After the plastic has been introduced into the mold cavity, the mold is closed, so that the plastic is forced into the mold cavity so as to fill it completely. However, a partly open mold has considerable disadvantages, such as lack of precision, risk of plastic flowing away, unknown degree of filling of the mold cavity, and the like.

It has further been proposed to use a mold with at least one movable wall part of the mold cavity. In that way, with the mold closed, the resistance for plastic flowing in can be limited at least temporarily. Such molds are complex in construction because the injectors for the plastic are placed at a distance from and for instance opposite to such movable wall part. As a consequence, they need to be built into different parts of the mold, and for instance the or each injector will have to be able to move along with a movable part of the mold.

SUMMARY OF THE INVENTION

The object of the invention is to provide a mold which is relatively simple in structure and use and yet mitigates or removes at least a number of the drawbacks of the known molds. To that end, a mold according to the invention is characterized by a mold cavity which is at least partly defined by a movable wall part, wherein injection means are provided for introducing material into the mold cavity, which injection means comprise at least one injection opening which is provided in at least one stationary wall part of the mold cavity, wherein said stationary wall part is at least partly surrounded by said at least one movable wall part.

In a mold according to the invention, a movable wall part is provided which can move along a stationary part. In the stationary part, at least one injection opening is provided through which plastic or other material to be processed can be introduced. The stationary part or the stationary parts jointly preferably have a frontal surface that is smaller than the frontal surface of the respective moving wall part. In this way, the advantage is achieved that the injection pressure can be kept relatively low while yet a relatively simple mold can be formed.

Frontal surface should herein be understood to mean the surface of the stationary part and the movable part, respectively, that extends approximately at right angles to a direction of movement of the respective movable part.

In a first embodiment, the stationary part is provided in a central part of a part of the mold cavity, so as to be enclosed by the respective movable wall part. As a result, the plastic can flow away from the respective injection opening to all sides.

In an alternative embodiment, several stationary parts are provided, for instance in or near ribs and/or corners of a bottom-forming part of the mold cavity, such that the movable wall part can move between these. In this way, material from the respective injection openings can flow both into a bottom-forming part and, for instance, into a wall-forming part of the mold cavity.

Of course, combinations of the above can be used as well.

In a mold according to the invention, preferably a profiling is provided in the frontal face of the respective movable part, for instance a pattern of slots, ridges or the like, which can be provided for instance in a bottom surface of a product to be formed. In this way, flow paths for the plastic with still less resistance are obtained, while stiffening elements, decorative elements or the like can be provided in the product. For instance, a structure of ribs is provided, stationary relative to the or each stationary part, between which the movable part can move.

In a further development, a mold according to the invention is provided with movable wall parts in different parts of the mold cavity, for instance one or more first movable wall parts in a bottom-forming part and one or more second and/or further movable wall parts in a wall-forming part of the mold cavity.

At least one of the movable wall parts can preferably move so fast that during use, adiabatic heat development occurs in plastic in the mold cavity, preferably such that the viscosity thereof is reduced as a result of the temperature rise and hence flow is simplified further. The speed of movement that is needed for this will have to be determined in each case on the basis of, among other things, the shape of the respective movable wall parts and the mold cavity, the material used, the requisite flow paths, the moving distance of the respective wall part and the like. On the basis thereof, a skilled person will be able to determine the proper speed and/or distance simply and experimentally.

In a mold according to the invention, preferably, next to the or each injection opening, a guide surface is provided which slopes in a direction away from the respective injection opening. As a result, the passage of the flow path increases more and more, so that the flow resistance is reduced. This means that the injection opening can be simply placed opposite for instance a fixed wall part of the mold cavity, without the necessary injection pressure increasing undesirably. As a result, moreover, in a finished product, further stiffening parts can be obtained. The or each guide surface can for instance extend from a respective injection opening to a point near a frontal surface of the adjacent movable wall part when this has been brought into the retracted position.

Preferably, in the retracted position, the frontal surface of the movable wall part is at a greater distance from the first level of the injection opening than in the forwardly moved position. However, this distance can for instance also be equal but then be located on opposite sides of the first level.

The invention further relates to a method for the manufacture of products using a mold, in particular a mold according to the invention, characterized by at least one movable wall part, wherein after injection of plastic into a mold cavity of the mold via an injection opening included in a stationary part, at least one movable wall part is moved along said at least one stationary part, thereby displacing plastic.

With such a method, products can be manufactured in a particularly simple and accurate manner, also if these have a complex structure, thin walls, long flow paths, narrow passages or the like.

BRIEF DESCRIPTION OF THE DRAWINGS

To clarify the invention, exemplary embodiments of a mold and method according to the invention will be described with reference to the drawing, in which:

FIG. 4 shows in a partly cross-sectional side view according to FIG. 3 the left-hand half of the mold in open condition, with the first movable wall parts in a forwardly moved position and the second movable wall parts in a retracted position;

FIG. 4A shows a portion of a fixed wall part with a first movable wall part moved away;

FIG. 4B shows in cross-sectional view a stationary part surrounded by a third movable wall part;

DETAILED DESCRIPTION OF THE INVENTION

Figure 1:
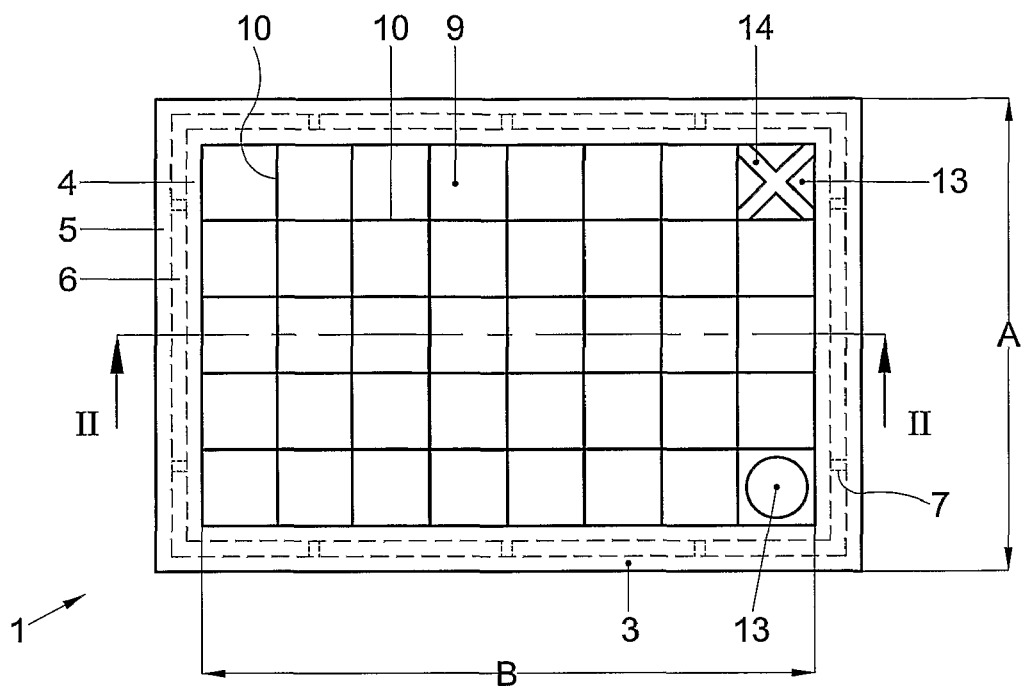
FIGS. 1 and 2 show a product in top plan view and partly sectional side elevation.

In this description, identical or corresponding parts have identical or corresponding reference numerals. Combinations of parts of the embodiments shown are understood to be represented herein as well. In this description, as an example, a crate, in particular a crate for bottles, will be described. However, the invention should not in any way be taken as being limited thereto. Many other holders, with or without compartmentation, having bottom surfaces of a variety of different shapes such as circular, rectangular, square, or any other shape, are possible within the framework of the invention. Also, holders can be formed with and without cavities in the sidewalls and/or bottom. Further, also other products can be manufactured in the same or a comparable manner, for instance partly hollow plate-shaped, bar-shaped, tubular or differently shaped products. The products can have a longitudinal wall or longitudinal walls extending at right angles to a bottom surface, but the or a longitudinal wall thereof can also be inclined relative to the bottom surface.

In a mold and method according to the invention, different materials, in particular different plastics, can be used, in particular thermoplastic plastics and blends. Also crystalline plastics and mixtures thereof have particularly good utility within the invention.

Figure 2:
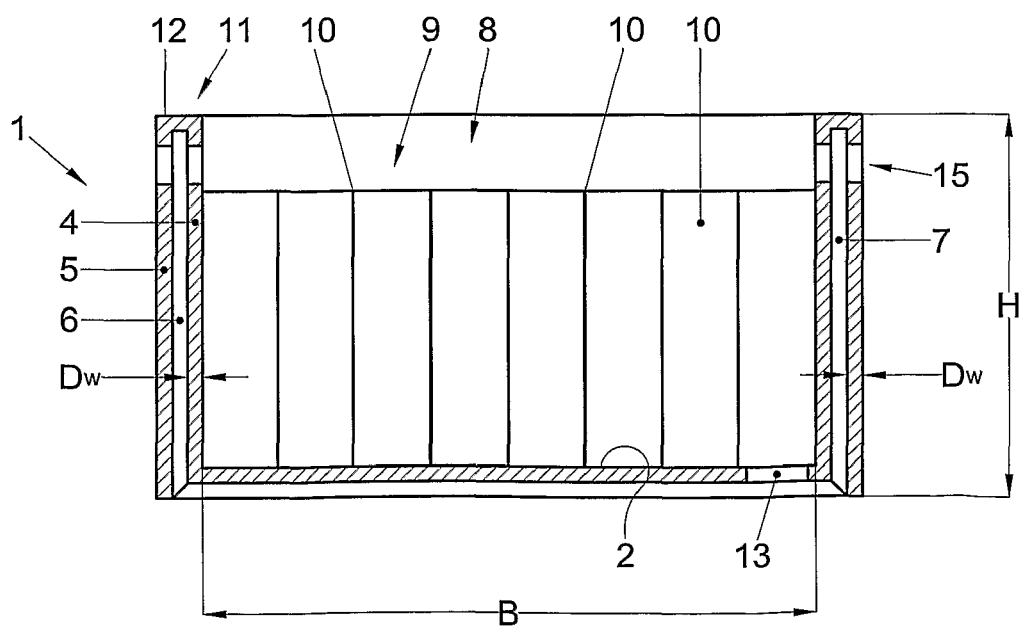

FIG. 1 shows, in top plan view, a holder 1 according to the invention, in the form of a bottle crate, to which the invention is not limited. FIG. 2 shows the holder 1 in cross-sectional side view. This holder 1 comprises a bottom surface 2 and a longitudinal wall 3 extending therefrom. The longitudinal wall 3 is substantially double-walled, which means that it comprises a first wall 4, a second wall 5 and, located therebetween, a cavity or open space 6. The wall thickness Dw is relatively small with respect to the dimensions A, B of the bottom surface 2 and the height H. The wall thickness can be, for instance, between some tenths of millimeters and some millimeters, depending on, for instance, the holder dimensions, intended use and the like. Between the walls 4, 5 cross partitions 7 can be provided, preferably having a comparable wall thickness, for stiffening and increasing the bearing capacity. Within the longitudinal wall 3 and the bottom surface 2, in an inner space 8, a compartmentation 9 is provided by cross walls 10. These reach to a point under the upper side 11 of the longitudinal wall 3. The upper ends of the walls 4, 5 are interconnected by a carrier edge 12, preferably having a wall thickness comparable to that of the walls 4, 5. In the bottom surface 2, openings 13 can be provided, being for instance circular, as shown at the bottom, right, or formed by cross bars 14, as shown at the top, right. By providing openings, material and weight, cooling time and/or closing pressure can be limited. In the longitudinal wall 3 handles 15 are provided at opposite sides.

Hereinafter, a mold 20 and method will be described which can be used for a holder 1 according to the invention. It will be clear, however, that also a variety of other products can be manufactured with a comparable mold, for instance containers of a different kind, especially also single-walled holders.

Figure 3A:
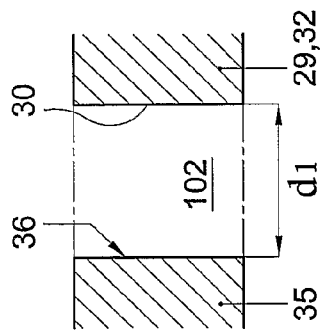
FIGS. 3A and B show on an enlarged scale the distance between the second movable wall part and an adjacent core (part), with the second movable wall part in the retracted position and in the forwardly moved position, respectively.
Figure 3B:
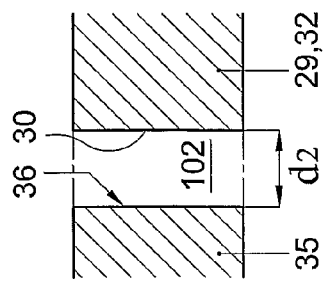
FIG. 3 shows, in partly cross-sectional side view along the line III-III in FIG. 6, a mold according to the invention, in closed condition, with on the left in the drawing a second movable wall part in a retracted position and on the right in a forwardly moved position.
Figure 3:
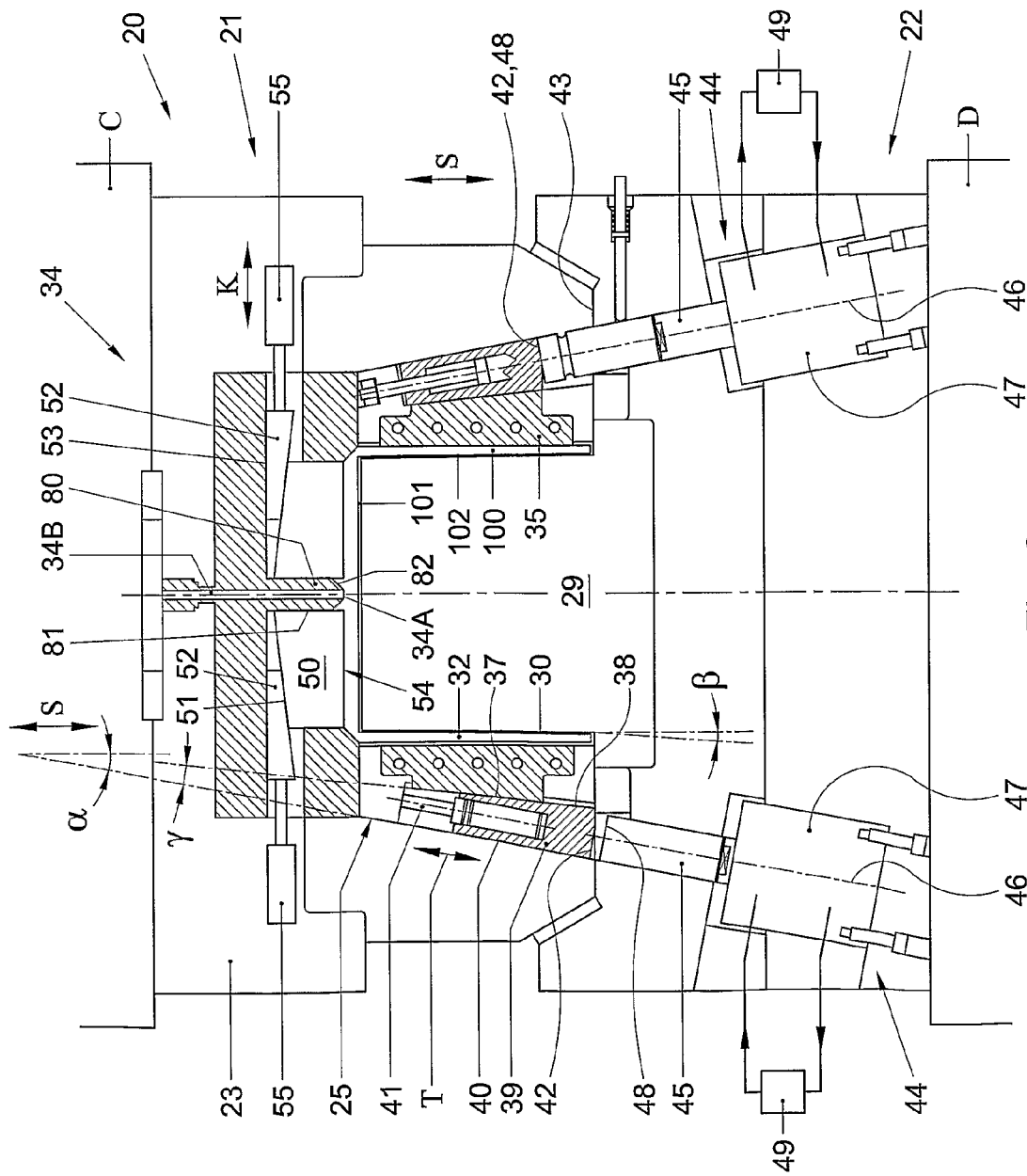

FIGS. 3 and 4 show a mold 20 in a closed and open condition, respectively. The mold 20 comprises a first part 21 and a second part 22, which can move relative to each other in an opening and closing direction, indicated by the arrow S. To that end, for instance the first part 21 is included on a fixed table C and a second part 22 on a movable table D of a press (not shown) or like injection molding apparatus known per se. Incidentally, a variety of other means can also be used for opening and closing the mold 20. The mold 20 comprises a mold cavity 100 with a first part 101, being a bottom-forming part in the exemplary embodiment shown, and a second part 102, being a wall-forming part in the embodiment shown.

Figure 5:
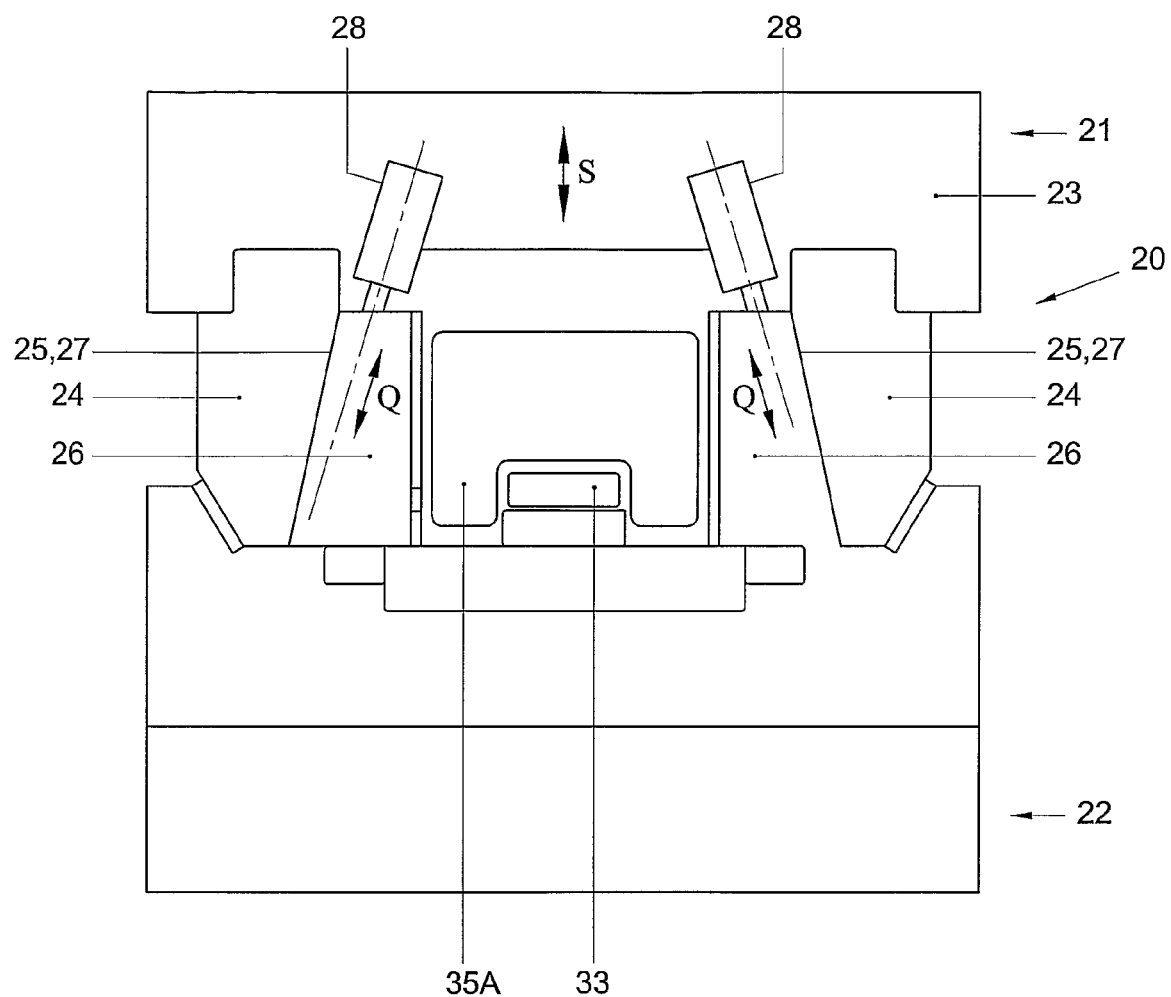
FIG. 5 shows in sectional front view along the line V-V in FIG. 6 a mold according to the invention, in closed condition.
Figure 6:
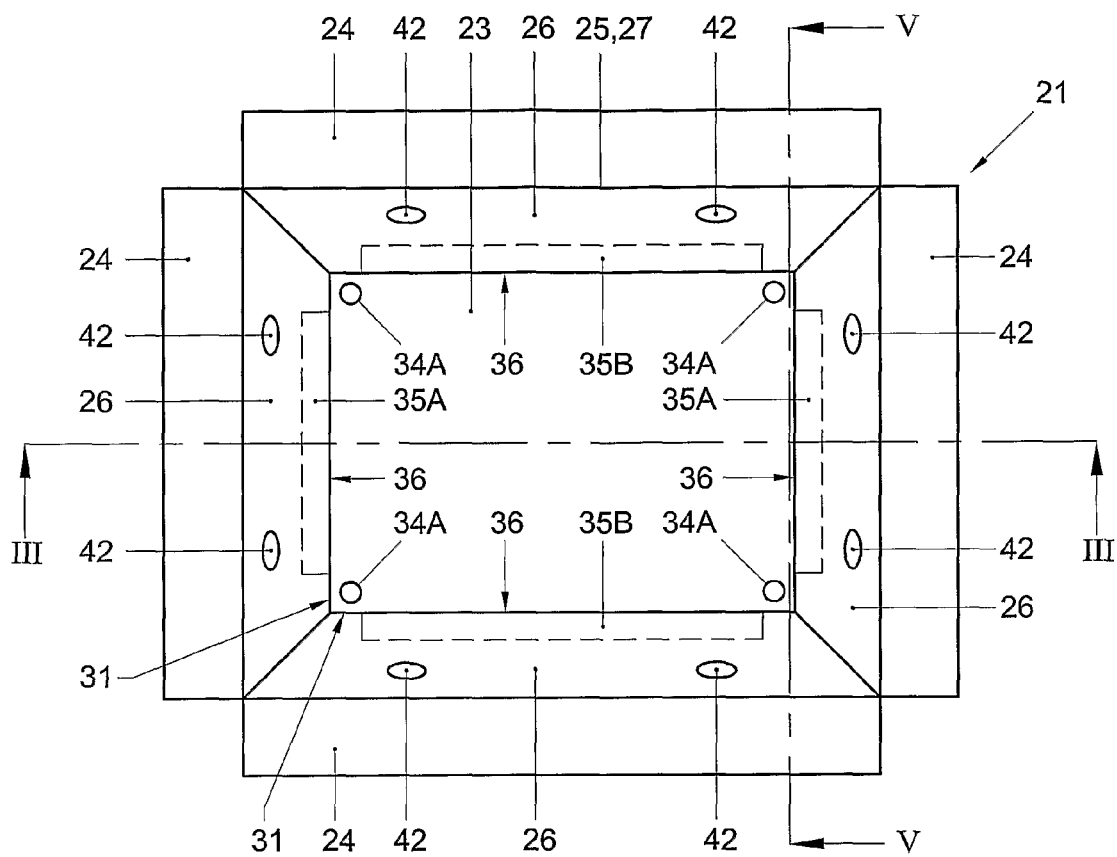
FIG. 6 shows a first mold part according to the invention, in an elevation seen from the second mold part.

FIG. 6 schematically shows an elevation of the first part 21, viewed in the direction S from the (removed) second part 22. The first part 21 comprises a bottom plate 23 having thereon four fixed wall parts 24 upstanding from the bottom plate 23, extending along the sides of a rectangle. The fixed wall parts 24 are provided, on the sides facing each other, with a first guide surface 25 which includes an angle α with the direction S. On each fixed wall part 24, a movable wall part 26 is carried, of which a second guide surface 27 abuts against the first guide surface 25 and includes a same angle α with the direction S. First operating means 28, as schematically drawn in as a piston-cylinder assembly in FIG. 5, are included in the first mold part 21 for moving the movable wall part 26 along the first guide surface 25 in a second direction Q, parallel to angle α.

As appears clearly from FIGS. 3-6, the second mold part 22 is provided with a core part 29 which, with mold 20 closed, can be moved between the movable wall parts 26, for forming for instance the inner space 8, the partitions 7 and the like. In the drawing, for simplification, the core part 29 is drawn as a block, with sides having a draft angle β. As appears from FIG. 3, with the mold closed, between the sides 30 of the core part 29 and the wall surface 31 of each movable wall part 26 that faces the core part 29, a thin core 32 is included, mounted on the bottom plate 23, for forming the cavity 6 in the walls of the holder 1. These cores 32 can be omitted if for instance a holder 1 with solid walls is manufactured. As appears from FIG. 4A, on the wall surface 31 a projection 33 may be provided which, with the mold closed, reaches into or through the core 32, for instance as far as against the core part 29, and can form a handle 15 or other opening or a deepened portion in the respective side of the holder 1.

In each of the movable parts 26, in the wall surface 31 a first or second movable wall part 35A, B is arranged, which is movable between a retracted position, as shown in FIG. 3 on the left-hand side, and a forwardly moved position, as shown in FIG. 3 on the right-hand side. To that end, these first or second movable wall parts 35A, B can move in a direction G which, for instance, are all approximately at right angles to the opening and closing direction S. Each first or second movable wall part 35A, B has a wall-forming part 36 on the side facing the core part 29. On the opposite side, each movable wall part 35A, B is provided with a first operating surface 37. Seen from the core part 29, behind each first or second movable wall part 35A, B, against the first operating surface 37, a second operating surface 38 has been laid which forms part of a slide 39 which is movable along the first operating surface 37, in a third direction T. Each slide 39 has its opposite countersurface 40 supported against the first guide surface 25 and can move along it. Each slide 39 is slightly wedge-shaped, in the sense that the countersurface 40 and the second operating surface 38 slant towards each other in the direction of the bottom plate 23. The first operating surface 37 includes an angle γ with the first guide surface 25, which approximately corresponds to the wedge angle γ of the slide 39. This means that if the slide 39 is moved in the third direction T towards the bottom plate 23, the respective first or second movable wall part 35A, B is pushed away from the first guide surface 25. Since this first or second movable wall part 35A, B is guided by the movable wall part 26 so as to be movable only in the fourth direction mentioned, it is forced in the direction of the core 32 and the core part 29.

As appears clearly from FIG. 6, the first movable wall parts 35A are provided in the wall-forming parts arranged for forming the end walls 4, 5 of the holder 1, while the second movable wall parts 35B are provided in the wall-forming parts arranged for forming the sidewalls 3 of the holder 1. In the exemplary embodiment shown, the end walls have a smaller surface than the sidewalls.

For obtaining proper guidance, each slide 39 is slidable over or along a guide rod 41 which extends through the first movable wall part 26 in the direction T.

On the side remote from the bottom plate 23, an end 42 of the slide 39 is situated in or near a partial surface 43 of the mold. In FIG. 6 an embodiment is shown where for each first or second movable wall part 35A, B two slides 39 are provided, whose ends 42 have been drawn in as ovals.

In the second mold part 22, for each slide 39 an operating means 44 is provided, comprising a piston-cylinder assembly 47 with a piston rod 45 having a longitudinal axis 46 extending parallel to the third direction T. The piston rod can move in the direction of the longitudinal axis, and hence in the third direction T, driven by the piston-cylinder assembly 47, for instance hydraulically, pneumatically or electrically. Of course, all kinds of other means, known per se, can be provided for driving the piston rod 45 in the third direction T. The piston rod 45 has a forward end 48 which, with mold 20 closed, can abut against the end 42 of the slide 39, for moving same. As is clearly apparent, the piston rod 45 is not fixedly connected with the slide, so that the mold can be simply opened and closed.

In this embodiment, in the bottom-forming part, a third movable wall part 50 is provided. This wall part 50, on its side remote from the mold cavity 100, has two surfaces 51 sloping towards the middle. From two opposite sides, wedge-shaped slides 52 extend under the surfaces 51, which wedges 52 rest on a bottom 53 of a slot 54. Each slide 52 is drivable along the bottom 53 by means of a piston-cylinder assembly 55 or other earlier-discussed driving mechanism, in a direction K. In FIG. 3, the wall part 50 has been moved into a retracted position, that is, away from the core part 29.

In this condition, plastic can be introduced into the mold cavity 100 in the manner described earlier. For this purpose, the mold 20 is provided, in the bottom plate 23, with injection means 34, at least injection openings 34A, through which during use plastic or other material can be introduced into the mold 20, for forming a product such as holder 1 shown. In the exemplary embodiment shown, one central opening 34A is shown at the end of a channel 34B. The channel 34B and the opening 34A are provided in a stationary part 80 which is fixedly connected with the bottom plate 23. In the third movable wall part 50, a central opening 81 is provided, which abuts with a sliding fit against the circumference of the stationary part 80. Around the opening 34A is a guide surface 82 sloping in the direction of the top surface 54 of the movable wall part 50. In FIG. 4B this is shown on a slightly enlarged scale. Here, the opening 34A is at a first level N1, the upper surface 54 of the third movable wall part 50 is at a second level N2 when it has been brought into the retracted position, and at a third level N3 when the movable wall part 50 has been moved forwards into the forwardly moved position. Clearly, the distance between the first level and an opposite wall 29A of the core 29 is less than the distance between the second level N2 and that wall and the distance between the third level N3 and that wall, the third level in the embodiment shown being situated between the first and second level. As a result, the resistance upon injection with the surface 54 in retracted position will be small. The forwardly moved position is shown in broken lines. Clear to see are triangular inclusions between the wall part 50 and the guide surface 82, which will form stiffening elements in a finished product.

Since in a mold according to the invention the third wall part 50 can move along the stationary part 80, the injector does not need to move along with a moving part, so that the injection means 34 can be made of relatively simple design. This is especially advantageous in the use of hot runners.

Figure 7:
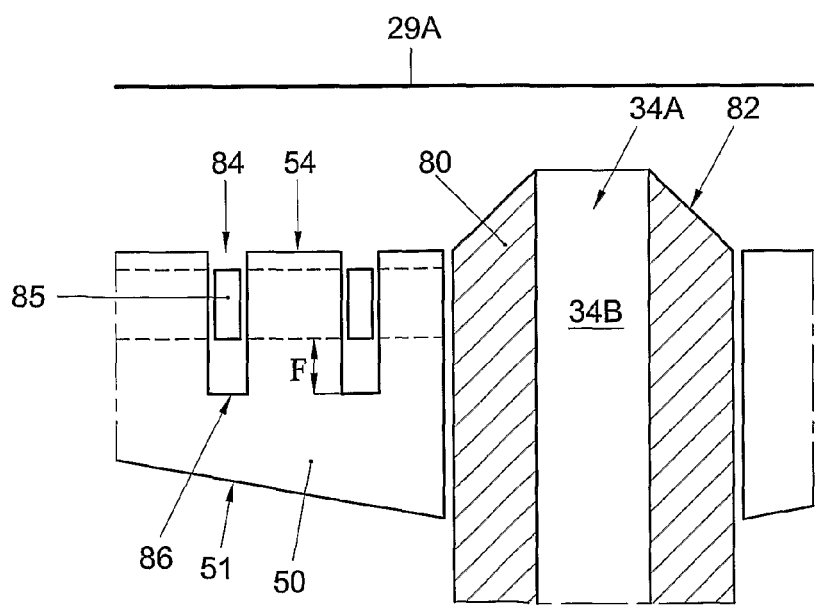
FIG. 7 shows, in a sectional side elevation, a portion of a third movable wall part with stationary part and profiling.

In FIG. 7, on an enlarged scale, a portion of a third wall part 50 is shown, around a stationary part 80. Here, in the top surface 54 of the third wall part 50 a series of slots 84 are provided, for instance comparable to the pattern of intermediate walls 10 of small height. In the slots 84, with a sliding fit, ribs 85 have been included, situated at a distance F from a bottom of the slots 84. By means of the earlier-described means, the moving third wall part 50 can be moved between the ribs 85, until the bottom 86 of the slots 84 abuts against the ribs 85. During use, plastic is displaced and forced into the slots 84, where ribs will be formed in the given pattern in the end product 1. The intermediate parts of the bottom 2 can be relatively thin. Of course, any desired pattern of ribs and/or slots can be provided. Also, the ribs can be omitted, so that the slots can function as widened flow paths for the plastic and will form the ribs still.

Figure 9:
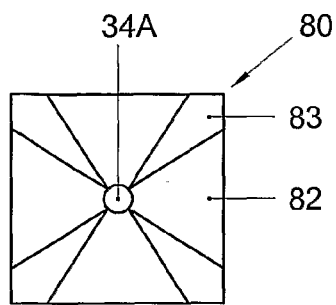
FIG. 9 shows in top plan view an alternative embodiment of a stationary part according to the invention.

In FIG. 9, in top plan view, an alternative embodiment of a stationary part 80 is shown, with injection opening 34A and four guide surfaces 82 widening in the direction away from the opening 34A and bounded by higher parts 83. In this way, in a simple manner, a preferred direction for the plastic can be created, which can naturally be simply adapted by adapting the guide surfaces.

A mold 20 according to FIGS. 3-6 can be used as follows.

The mold 20 is closed, as shown in FIG. 3, with the movable wall parts 26 in a forward position, in contact with the bottom plate 23, and the first and second movable wall parts 35A, B in the retracted position, as shown on the left-hand side. The piston rods 45 are in a retracted position, with the ends 42, 48 just butting against each other or at a slight distance. Moreover, the third movable wall part 50 is brought into a retracted position. In this condition, plastic is introduced into the mold cavity via the openings 34A. The plastic will at least largely fill the bottom-forming part 101 since the volume of plastic that is introduced into the mold cavity is virtually equal to the volume of the desired end product, whereas the volume of the mold cavity is greater as a result of the retracted first and/or second and/or third movable wall parts 35A, B, 50. After at least the greater part and preferably all of the plastic has been introduced into the mold cavity, the piston-cylinder assemblies 47 and 55 are energized. These will then move the first, second and third movable wall parts 35A, B, 50 to the forwardly moved position, as shown in FIG. 3 on the right-hand side. Plastic between the respective movable wall part and the opposite part of the core 32 or core part 29 will be displaced and the entire mold cavity is filled with the plastic. With all first, second and third movable wall parts 35A, B, 50 in the forwardly moved position, the volume of the mold cavity 100 is substantially equal to that of the plastic introduced, while optionally after-pressure can be applied for compensation of shrinkage. In this condition the mold cavity moreover has the shape of the desired product.

After in this condition the plastic has been allowed to solidify for some time, the mold 20 is opened for removal of the product 1. To that end, the piston rods 45 are retracted substantially into the second part 22 of the mold 20, as shown in FIG. 3 on the left-hand side. Next, the second part 22 is moved away from the first part 21, preferably simultaneously, or at least synchronized, with the movement of the movable wall parts 26 to a rearward position shown in FIG. 4A. In that position, the projections 33 have been pulled away, and the product 1 (not shown in FIGS. 4 and 4A) can be taken from the first mold part 21. Next, the mold 20 can be closed again for a next cycle.

With such a mold, the introduction of the plastic is simplified still further and the pressure can be kept low, also if a thin bottom wall and/or particularly long flow paths are used. In this way, also ribs and the like can be provided in a simpler manner.

In this embodiment, using the control unit 60, first the or each third movable wall part 50 is set into motion, next, in a second step, the or each first movable wall part 35A, and then, in a third step, the or each second movable wall part 35B. In this way, a particularly advantageous movement of the plastic through the mold cavity 100 is obtained. Since the plastic is introduced in relatively warm condition into a relatively large bottom-forming space 101, relatively little energy will be needed to spread the plastic through this space 101 and to force it into the wall-forming parts 102. Next, the plastic will be spread into the end wall-forming parts and eventually into the sidewall-forming parts. The second and third steps can start after the third movable wall part 50 has been brought into the forwardly moved position, but preferably at least the second step already begins before the or each third movable wall part has reached the forwardly moved position referred to. The third step preferably begins before the or each movable wall part 35A has reached the forwardly moved position.

In the exemplary embodiment shown, the piston-cylinder assembly 47 is driven by hydraulic means, schematically indicated by the rectangle 70. Such means will be immediately clear to the skilled person. A control unit 60 is provided for operating the different hydraulic means 44, as will be discussed in more detail hereinafter.

It is preferred that the second movable wall parts are moved to the forwardly moved position at high speed, preferably so fast that adiabatic heat development occurs at least in a part of the displaced plastic. It is advantageous in particular when the temperature in the displaced plastic and/or plastic to be displaced thereby obtains and/or keeps a temperature above the melting temperature of the respective plastic, so that the viscosity is reduced. The speed will then have to be chosen depending on for instance the plastic used, the desired wall thickness of the product at the respective positions, the total dimensions of the product, flow path lengths and cross sections, moving distance of the second movable wall parts. The suitable speed can be simply determined, for instance through experimentation with different speeds. As a consequence, the injection pressure of the plastic can be relatively low, and so can the closing pressure for keeping the mold closed. As a result, the properties of the plastic are not adversely affected and relatively stress-free products can be formed with particularly thin wall thicknesses and/or different wall thicknesses, and moreover relatively short cycle times are achieved. Moreover, as a result of the relatively low pressures, the advantage is achieved that relatively little material needs to be used for the mold, and cores, inserts and the like, if applicable, can be made of light and thin design. In this way, the freedom of design is enlarged still further.

In the embodiments shown, the angle α is for instance in the order of magnitude of between 5 and 30 degrees, more particularly approximately 15 to 20 degrees and the angle β between the closing direction S and the wall 30 is particularly small, in particular less than 5 degrees, for instance 1 to 2 degrees. The angle γ in the exemplary embodiment shown is smaller than the angle α and is between 1 and 10 degrees. This angle is for instance 2 to 6 degrees. These angles can in each case be chosen in a suitable manner on the basis of the desired speed of movement of the slide 39 and the second movable wall part 35, the force required therefor and the distances to be traveled.

Figure 8:
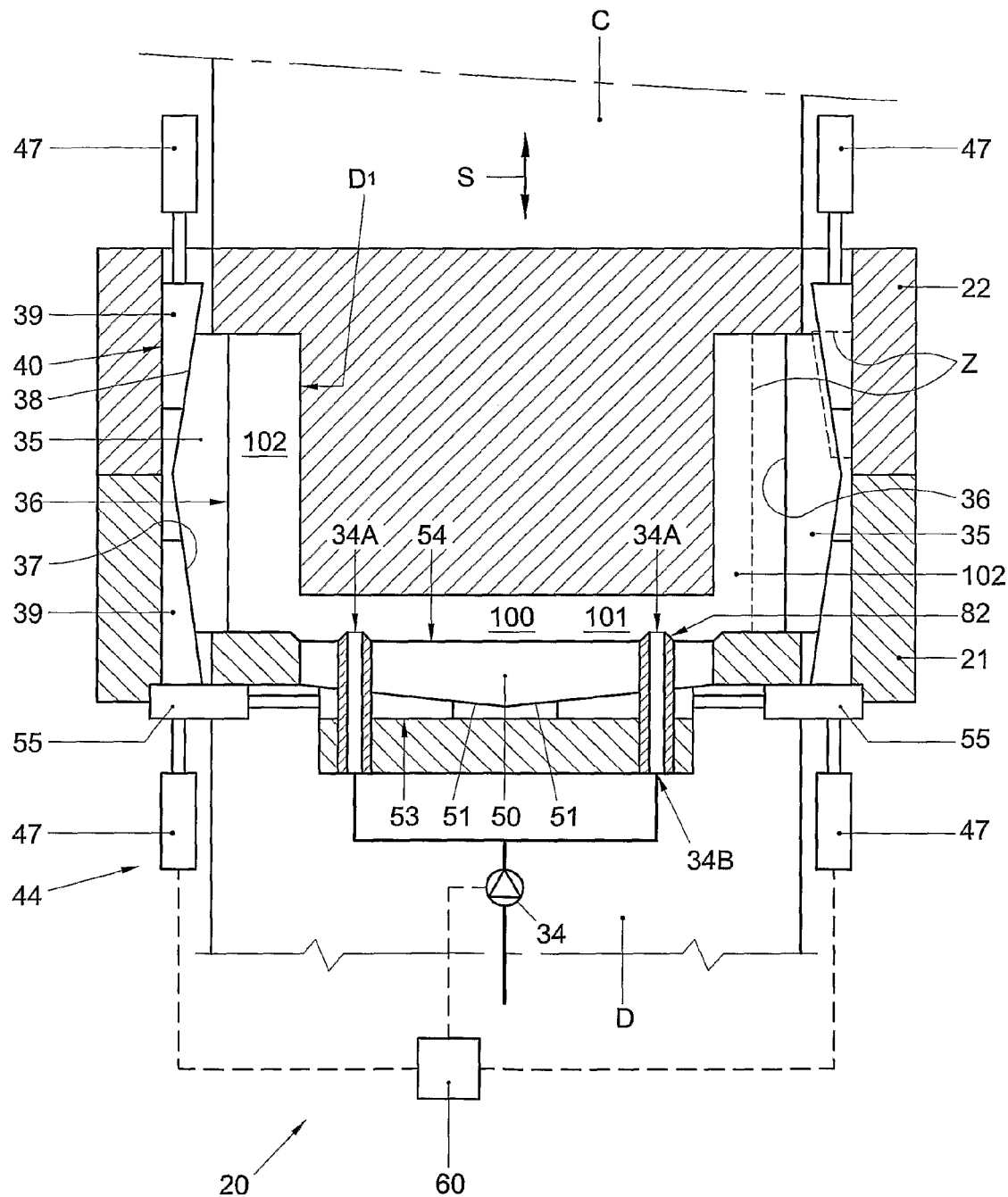
FIG. 8 shows in sectional side elevation an alternative embodiment of a mold according to the invention.

A holder 1 according to the invention can also be manufactured, for instance, in a mold 20 according to FIG. 8. This mold 20 is included in an injection molding apparatus, at least press, known per se, of which are shown parts of a fixed table D and a table C, movable relative thereto in a first direction of movement S. The mold 20 comprises a first part 21, arranged on the fixed table, and a second part 22, movable relative thereto, mounted on the movable table C. The first direction of movement S, of course, can have any orientation, for instance vertical as shown in FIG. 8, but also horizontal, by tilting the press.

The second part 22 comprises a central core part 29, for forming the interior space 8 of the holder 1. This central core part 29 is surrounded on all sides at a distance D1. The distance D1 corresponds to the wall thickness D of the first wall 4 of the holder 1, which is single-walled here. Between a forward end of the central core part 29 and the first part 22, a space 101 is provided for forming the bottom surface 2. In this space 101 terminates a supply opening 34A through which plastic can be introduced into the mold cavity 100. In the embodiment shown, a bottom part of this bottom-forming part is formed by a third movable wall part 50 which, in a manner described earlier, is provided with drive means 55 and wedges 52 for moving it between a retracted position and a forwardly moved position. In this embodiment, a series of injection openings are provided, for instance four in the corners of a bottom surface 2, as schematically shown in FIG. 6, which are each included in stationary part 80 along which the movable third part 50 can move, as described earlier with reference to FIG. 3.

In the example shown, on the side of the second core part 32 remote from the central core part 29, on two sides a first movable wall part 35A is provided in the form of a slide which is movable in a direction of movement C. The surface 36 has the shape of the outer side of the respective part of the longitudinal wall 3. Optionally, a projection 33 (not shown) may be provided on the slide 35A for forming the handle 15.

In the position shown in FIG. 8, the wall parts 35A and 50 are shown in a retracted position, that is, at a distance D2 from the core 29 that is greater than the desired wall thickness D3 of the respective wall 2, 5. Accordingly, between the slide 35A and the adjacent core part 29, a relatively large, wide space 102 is provided, through which plastic can flow readily and without much resistance.

Provided on the rear side of the slide 35A are inclined surfaces 37, in the embodiment shown two surfaces 37 which are inclined in opposite directions. Furthermore, a flat running surface 40 is provided behind the slide, that is, on the side thereof remote from the second core part 32. Provided between the inclined surfaces 37 and the running surface 40 are wedges 39 with correspondingly inclined surfaces 38 and running surfaces. The wedges 39 are connected with drive means 44, in FIG. 8 constructed as piston-cylinder assemblies 47, with which the wedges 39 can be moved from the first position shown in FIG. 8 to a forwardly moved position (represented in FIG. 8 on the right-hand side in broken lines, designated by Z) and vice versa. Through movement of the wedges 39 to the second position, the slides 35A are moved inwards, that is, to the second core part 32. As a result, the space 102 is reduced and hence plastic present therein is displaced and/or slightly compressed.

In top plan view, a mold 20 according to FIG. 8 is comparable to that in FIG. 6, in the sense that a pair of first movable wall parts 35A are provided along the short end sides of the mold cavity 100.

A mold 20 with press can be used as follows.

The mold 20 is brought into the closed position shown in FIG. 8 and held closed by the press with a relatively light closing pressure. The closing pressure is lower than is necessary for injection molding a similar holder using conventional injection molding technique and injection mold, which can conventionally be determined from, basically, the projected surface in the direction S, the flow paths, in particular the wall thicknesses, and the plastic used.

The slides 35A, 50 are brought into the retracted, first position, whereupon, using means suitable therefor, plastic is introduced via the supply openings 34A into the space 101, preferably in molten, at least substantially fluid form. From the space 101, the plastic flows partly into the spaces 102. Since the plastic experiences substantially no resistance in the spaces 102, it can easily flow into them without undesired pressure build-up and/or solidification of the plastic. Next, when substantially all necessary plastic has been introduced into the mold cavity 100, the drive means 55 and 44 are energized using a control unit 60. As a result, the wedges 52 and 39 are moved to the second position and the slides 50 and 35A are forced in the direction of the core 29. As a result, the plastic is forced further into the mold cavity 100, in particular up to the end of the space 102, so as to fill it completely.

The control unit 60 is then set such that the slides 39 and 52, at least the movable wall parts 35A and 50, are not moved all at the same time. In a first step, the third movable wall parts 50 are moved. Next, in a second step, the first wall parts 35A for the end walls 4, 5 are moved. Optionally, and if present, next, in a third step, the movable wall parts for the sidewalls 3 can be set into motion. As a result, the available energy is utilized in a suitable manner, and the plastic can moreover be set into motion and kept moving better. In general, preferably, in each case, first the or each movable wall part having a relatively small surface is set into motion and only then a part having a larger surface. The first and second steps can be carried out such that the second step does not begin until the first step has been carried out completely, which means that the third movable wall parts 50 have been moved into the forwardly moved position completely. However, it is preferred that the second step is started sooner, that is, the first movable wall parts 35A are set into motion while the third movable wall parts 50 are still moving. In this way, a still better spread of the plastic can be obtained.

As the direction of movement C includes an angle with the direction of movement S, a favorable loading of the different parts is obtained. Since the plastic can flow into and through the mold cavity 100 without much resistance, relatively low pressures will suffice. This prevents, for instance, bending of the second core parts 27 and counteracts excessive wear. Moreover, partly as a result of this, the required closing force can be kept low.

After the slides have been moved forwards to a maximum, the plastic can solidify and, after optionally retracting the slides, and after opening the mold 20, the holder 1 can be taken out. As a result of the relatively low injection pressure, the product will be virtually stressless.

In FIG. 8 the openings for forming the partition walls 10 are omitted for clarity.

The slides 35 of a mold 20 can be moved so fast that adiabatic heat development occurs in the plastic. As a result, the flow properties of the plastic can be further improved and any plastic which has solidified can be liquefied again. Alternatively, the slides 34 can also move slowly, so that the plastic is not heated, or is heated only to a very limited extent, and already solidifies to some extent during introduction. Also, it may be elected to move the slides in the direction of the second position already during introduction of the plastic, so that the plastic is kept moving continuously. This can be advantageous in particular with, for instance, crystalline plastics and plastics having a glass transition point and/or a low melt, or when product properties of the plastic are to be carefully maintained.

Figure 10:
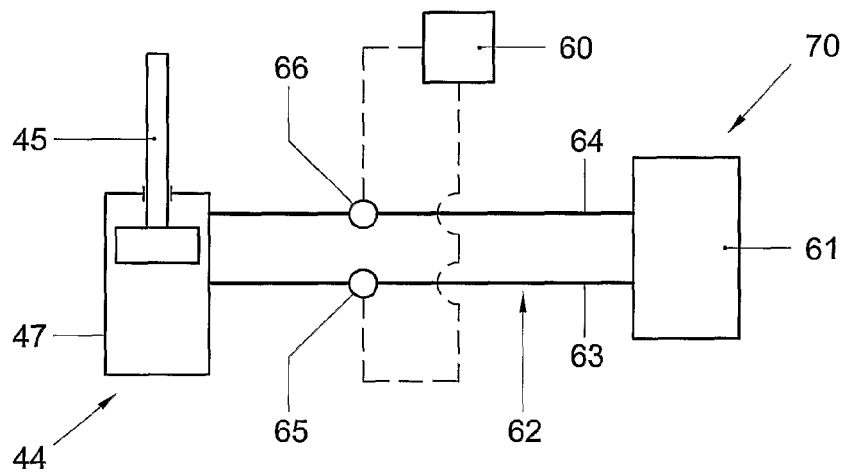
FIG. 10 schematically shows a control unit for operation of a piston-cylinder assembly according to the invention, in a first embodiment.

FIG. 10 shows a diagram of an apparatus 70 for control and operation of at least a number of the operating means 44 for the movable wall parts 35A, B and 50. This apparatus 70 comprises a pressure device 61, for instance a pump and/or accumulator, which communicates via a line system 62 with the different operating means 44, in particular the piston-cylinder assemblies 47. Between each piston-cylinder assembly and the pressure device extends a supply line 63 and a discharge line 64. Each of the lines 63, 64 includes a valve 65, 66. A control unit 60 is connected with the pressure device 61 and the valves 65, 66. Before a respective wall part 35A, B or 50 is to be moved, at least the valves 65 in the supply lines are closed and using the pressure device pressure is built up in the section of the line 63 extending between the pressure device and the respective valve 65. When this pressure is sufficiently high, for instance at a maximum, the valve 65 is controlled to open instantaneously, while the valve 66 in the discharge line 64 has been or is opened. As a result, the piston of the respective piston-cylinder assembly 47 will be moved instantaneously with very high speed, thereby operating the movable wall part 35A, B, 50. Next, using the discharge line, the piston is returned to the initial position and the valves are closed. The valves 65, 66, in particular the valves 65 in the supply lines, are arranged as closely as possible to the respective piston-cylinder assembly 44, so that the line section 63A between the valve 65 and the respective piston-cylinder assembly 44 is shorter than the section between the valve 65 and the pressure device, and preferably as short as possible. Surprisingly, it has been found that in this way the drive of the respective movable wall parts 35A, B and 50 is possible still more accurately. Without wishing to be bound to any theory, this seems to be the result of the mass inertia of the fluid in the lines. By placing the greater part of the lines under a relatively high working pressure, only a small part of the fluid needs to be set into motion and/or placed under pressure after the valves 65, 66 are opened, so that a much quicker response has been found possible. Moreover, in this way, the advantage is achieved that the movable wall parts can be driven more accurately. Preferably, for mutually associated movable wall parts, such as the pair of parts 35A or the pair of parts 35B, the line section 63A between the respective piston-cylinder assembly and the associated valve is made of corresponding design in each case, such that a substantially equal amount of fluid is present in them. Thus, the accuracy is influenced still further. Using for instance PLCs, the valves can be set and driven in a particularly accurate manner.

Figure 11:
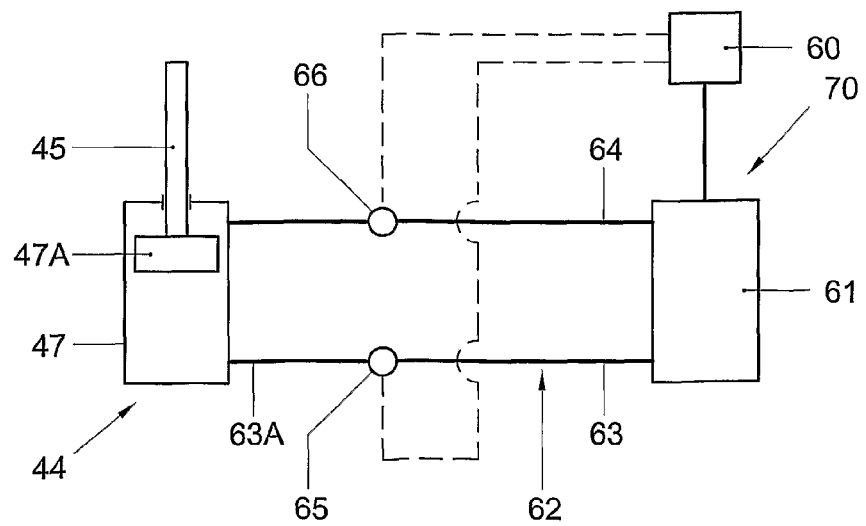
FIG. 11 schematically shows a control unit for operation of a piston-cylinder assembly according to the invention, in a second embodiment.

FIG. 11 shows an alternative embodiment, in which a double-acting piston 47A is provided. Supply line 63 and discharge line 64 terminate on opposite sides of the piston 47A. The control device is set such that prior to operation of a movable wall part 35, 50, on both sides of the piston the same high pressure prevails in the fluid, at least such pressures that the piston remains in a preselected position. When the respective wall part 35, 50 is to be moved to the forwardly moved position, the valve 66 in the discharge line 64 is opened, so that the pressure on that side of the piston 47A falls out and the piston is forced in that direction with force and high speed. In this way, in a particularly simple and accurate manner, the piston and hence the respective movable wall part 35, 50 can be moved.

It will be clear that each of the apparatuses 70 as shown in FIGS. 10 and 11 can be used with each of the molds 20 and methods as described earlier. Such apparatuses 70 can also be used for other moving parts in molds, whether or not according to the invention.

The invention is not limited in any way to the embodiments shown and described in the description and drawing. Many variations thereon are possible within the framework of the invention as outlined by the claims.

For instance, a plurality of mold cavities may be included within a mold according to the invention, both next to and above each other, for instance on opposite sides of the bottom plate. The first and second mold part can be interchanged, so that injection proceeds through or along the core part 29. In-mold labels, inserts and the like can be used in a mold according to the invention. The mold cavity can have any desired shape. It will be clear that any desired number of first, second and/or third movable wall parts can be used, depending on the products to be formed. A product formed with a mold or method according to the invention can for instance have a fully closed bottom, single-walled sidewalls or parts thereof, a different compartmentation or none, and the like. Other operating means may be provided for moving the slides and wedges, for instance electric or pneumatic mechanical lever systems, linkages and the like. Optionally, the energy of injection of the plastic can be used at least partly for moving one or more movable wall parts, for instance to a retracted position. What is shown is a continuous wall of the product 1. However, individual, mutually separated wall parts can naturally be used as well. The or each fixed wall part can be shaped and/or placed differently and can for instance carry the first movable wall parts on their sides.

In the embodiments shown, the operating means 40 are included in the second mold part. However, it is naturally also possible to include them at least partly in the plate D of the press. The second part 22 of the mold can then comprise the shafts 45. In this way, a universal tool can be manufactured on which in each case a different mold 20 can be placed which can be made of particularly simple and light design since the relatively heavy and costly parts of the operating means 44 can be used again and again.

It will be clear that the directions of movement can also be chosen differently than shown. Thus, for instance, the slide 39 can be made to be movable parallel to the first direction S, with adaptation of the operating surfaces 37, 38, at least the angle thereof with respect to the direction S. Also, in principle, the operating means 44 for the movable wall parts 35 can be included in the first mold part 21, with adaptation of the operating surfaces 37, 38, such that the slide 39 is moved in the direction of the second part 22 for moving the second movable wall part 35 to the forwardly moved position. Many variations thereof are possible and will be immediately clear from the description and drawings to those skilled in the art.

These and many comparable embodiments are understood to fall within the invention.

The invention claimed is:

1. A method for forming a product using a mold having at least one movable wall part, wherein after injection of plastic into a mold cavity of the mold via an injection opening included in a stationary part, at least one movable wall part is moved along said at least one stationary part, thereby displacing plastic, said movable wall part having a surface facing said mold cavity, said surface having a profiling, and wherein a pattern of ribs is disposed within said profiling of said surface, said ribs being part of the mold and remaining stationary with respect to said stationary wall part and said movable wall part moving between said ribs during formation of a product in said mold.

2. A method according to claim 1, wherein said at least one movable part is moved such that adiabatic heat development occurs in said plastic during said displacement.

3. A mold, provided with a mold cavity which is at least partly defined by a movable wall part, wherein injection means are provided for introducing material into the mold cavity, which injection means comprise at least one injection opening which is provided in at least one stationary wall part of the mold, wherein said stationary wall part is at least partly surrounded by said at least one movable wall part, said movable wall part having a surface facing said mold cavity, said surface having a profiling, and wherein a pattern of ribs is disposed within said profiling of said surface, said ribs being part of the mold and remaining stationary with respect to said stationary wall part and said movable wall part moving between said ribs during formation of a product in said mold.

4. A mold according to claim 3, wherein the or each stationary wall part is situated in a bottom-forming part of the mold cavity.

5. A mold according to claim 3, wherein the or each injection opening is included in one stationary part which is enclosed by the at least one movable wall part.

6. A mold according to claim 3, wherein at least two injection openings are provided in two stationary parts, mutually spaced apart, wherein between said stationary parts at least the one movable wall part is provided.

7. A mold according to claim 3 comprising at least one mold cavity having a bottom-forming part and a wall-forming part, wherein in the bottom-forming part at least one first movable wall part is provided and in the wall-forming part at least one second movable wall part is provided.

8. A mold according to claim 7, wherein the or each first movable wall part has a first direction of movement and the or each second movable wall part has a second direction of movement, which first and second directions of movement mutually include an angle between 60 and 120 degrees.

9. A mold according to claim 7, wherein the or each injection opening terminates near a transition between the bottom-forming part and the wall-forming part.

10. A mold according to claim 3, wherein said profiling in the surface of said movable wall part comprises a pattern of slots and/or ridges.

11. A mold according to claim 3, wherein at least one injection opening is situated at a first level and the respective adjacent movable wall part is movable between a retracted position and a forwardly moved position, wherein in the retracted position a side of the movable wall part facing the mold cavity is situated at a first distance from said first level and in the forwardly moved position at a second distance.

12. A mold according to claim 11, wherein the first distance is greater than the second distance.

13. A mold according to claim 11, wherein the first and second distances are approximately equal but are situated on opposite sides of the first level.

14. A mold according to claim 3, wherein from a point near the or each injection opening a guide surface extends which is inclined such that in a direction away from the respective injection opening the distance between said guide surface and an opposite wall part of the mold cavity increases.

15. A mold for injection molding a plastic product, the mold including a first mold half and a second mold defining a mold cavity, at least one of the first and second mold halves comprising:
  a stationary wall part having an injection opening formed therein, said injection opening communicating with said mold cavity for introducing plastic into said mold cavity;
  a first movable wall part coupled to said stationary wall part, said first movable wall part being movable within said mold cavity in a first direction;
  a second movable wall part coupled to said first movable wall part, said second movable wall part being movable within said mold cavity in said first direction;
  a third movable wall part coupled to said stationary wall part and at least partially surrounding said injection opening, said third movable wall part being movable within said mold cavity in a second direction generally perpendicular to said first direction, said third movable wall part further having a surface facing said mold cavity, said surface being formed with a pattern of slots; and
  a plurality of fixed ribs disposed within said slots of said third movable wall part, said fixed ribs remaining stationary with respect to said stationary wall part during injection molding of the plastic product, and wherein said third movable wall part moves between said fixed ribs during injection molding of the plastic product.

* * * * *

UNITED STATES PATENT AND TRADEMARK OFFICE
CERTIFICATE OF CORRECTION

| | |
|---|---|
| PATENT NO. | : 7,771,645 B2 |
| APPLICATION NO. | : 11/794463 |
| DATED | : August 10, 2010 |
| INVENTOR(S) | : Hoogland |

It is certified that error appears in the above-identified patent and that said Letters Patent is hereby corrected as shown below:

ON THE TITLE PAGE:

ITEM (73) Assignee: now reads "ECIM Technologies B.V., Ijssel (NL)"
should read --ECIM Technologies B.V., Capelle A/D Ijssel (NL)--

Signed and Sealed this
Twenty-fifth Day of January, 2011

David J. Kappos
*Director of the United States Patent and Trademark Office*